(12) United States Patent
Kim

(10) Patent No.: US 11,244,248 B1
(45) Date of Patent: Feb. 8, 2022

(54) METHOD FOR TRAINING AND TESTING USER LEARNING NETWORK TO BE USED FOR RECOGNIZING OBFUSCATED DATA CREATED BY OBFUSCATING ORIGINAL DATA TO PROTECT PERSONAL INFORMATION AND USER LEARNING DEVICE AND TESTING DEVICE USING THE SAME

(71) Applicant: Deeping Source Inc., Seoul (KR)

(72) Inventor: Tae Hoon Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

(21) Appl. No.: 17/244,991

(22) Filed: Apr. 30, 2021

(30) Foreign Application Priority Data

Oct. 21, 2020 (KR) .................... 10-2020-0137124

(51) Int. Cl.
*G06N 20/00* (2019.01)
*G06F 21/62* (2013.01)
*G06K 9/62* (2006.01)

(52) U.S. Cl.
CPC ......... *G06N 20/00* (2019.01); *G06F 21/6254* (2013.01); *G06K 9/6259* (2013.01)

(58) Field of Classification Search
CPC .. G06N 20/00; G06K 6/6259; G06F 21/6254; G06F 21/6245
See application file for complete search history.

(56) References Cited

U.S. PATENT DOCUMENTS

| | | | | |
|---|---|---|---|---|
| 9,058,813 | B1* | 6/2015 | Blanksteen | G06F 40/279 |
| 10,621,378 | B1* | 4/2020 | Kim | G06N 20/00 |
| 2011/0010697 | A1* | 1/2011 | Golovkin | G06F 21/563 |
| | | | | 717/155 |
| 2017/0317983 | A1* | 11/2017 | Kompalli | G06F 21/6209 |
| 2018/0005626 | A1* | 1/2018 | Betley | G10L 15/02 |
| 2019/0188830 | A1* | 6/2019 | Edwards | G06K 9/6215 |
| 2021/0056405 | A1* | 2/2021 | Bradshaw | G06F 21/6254 |

OTHER PUBLICATIONS

Zhang T, He Z, Lee RB. Privacy-preserving machine learning through data obfuscation. arXiv preprint arXiv:1807.01860. Jul. 5, 2018 . (Year: 2018).*

(Continued)

*Primary Examiner* — Robert B Leung
(74) *Attorney, Agent, or Firm* — Husch Blackwell LLP

(57) ABSTRACT

A method for training a user learning network for recognizing obfuscated data is provided. The method includes steps of: a learning device (a) (i) inputting obfuscated data, from a data provider, into a user learning network to generate first characteristic information and (ii) updating parameters of a user task layer and a first user batch normalizing layer such that an error, calculated using (1) the first characteristic information or a first task specific output and (2) a first ground truth of the obfuscated data, is minimized, and (b) (i) inputting original data, from a user, into the user learning network to generate second characteristic information and (ii) updating parameters of the user task layer and the second user batch normalizing layer such that an error, calculated using (1) the second characteristic information or a second task specific output and (2) a second ground truth of the original data, is minimized.

18 Claims, 7 Drawing Sheets

(56) References Cited

OTHER PUBLICATIONS

Karnik A, Goswami S, Guha R. Detecting Obfuscated Viruses Using Cosine Similarity Analysis. AMS'07, 2007. (Year: 2007).*

Likarish P, Jung E, Jo I. Obfuscated malicious javascript detection using classification techniques. In 2009 4th International Conference on Malicious and Unwanted Software (MALWARE) Oct. 13, 2009 (pp. 47-54). IEEE. (Year: 2009).*

Wu H, Qin S. Detecting obfuscated suspicious JavaScript based on collaborative training. 2017 IEEE 17th International Conference on Communication Technology (ICCT), 2017, pp. 1962-1966, doi: 10.1109/ICCT.2017.8359972. (Year: 2017).*

McPherson R, Shokri R, Shmatikov V. Defeating image obfuscation with deep learning. arXiv preprint arXiv: 1609.00408. Sep. 1, 2016. (Year: 2016).*

Balakrishnan R, Sloan S, Aswani A. Protecting Anonymous Speech: A Generative Adversarial Network Methodology for Removing Stylistic Indicators in Text. arXiv preprint arXiv:2110.09495. Oct. 18, 2021. (Year: 2021).*

* cited by examiner

METHOD FOR TRAINING AND TESTING USER LEARNING NETWORK TO BE USED FOR RECOGNIZING OBFUSCATED DATA CREATED BY OBFUSCATING ORIGINAL DATA TO PROTECT PERSONAL INFORMATION AND USER LEARNING DEVICE AND TESTING DEVICE USING THE SAME

CROSS-REFERENCE TO RELATED APPLICATION

This application claims the benefit of priority to Korean Provisional Patent Application No. 10-2020-0137124, filed on Oct. 21, 2020, the entire contents of which are incorporated herein by reference.

FIELD OF THE DISCLOSURE

The present disclosure relates to a method for training a user learning network; and more particularly, to the method for training the user learning network to be used for recognizing obfuscated data created by obfuscating, e.g., anonymizing or concealing, original data to protect personal information and a user learning device using the same, and to a method for testing a trained user learning network and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as the big data in the sense that common software tools and computer systems cannot easily handle such a huge volume of data.

And, although such a big data may have no meaning by itself, it can be useful for generation of new data, judgment or prediction in various fields through machine learning on patterns and the like.

Recently, due to the strengthening of a personal information protection act, it is required to delete information, that can be used for identifying individuals, from the data or to acquire consent of the individuals in order to trade or share such a big data. However, it is not easy to check if any information that can be used for identifying the individuals is present in such a large amount of the big data, and it is impossible to obtain the consent of every individual. Therefore, various techniques for such purposes have emerged.

As an example of a related prior art, a technique is disclosed in Korean Patent Registration No. 10-1861520. According to this technique, a face-concealing method is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, in the input image, where the second image is generated to have a facial shape different from that of the facial region detected in the detection step.

However, according to conventional techniques as well as the technique described above, it is determined whether identification information such as faces, text, etc. is included in the data, and then a portion corresponding to the identification information is masked or blurred. As a result, a machine learning algorithm cannot utilize such data due to distortion of original data. Also, in some cases, the data may contain unexpected identification information which cannot be concealed, e.g., anonymized. In particular, a conventional security camera performs an anonymizing process by blurring every pixel changed between frames due to a target to be anonymized moving between the frames in a video, and if the anonymizing process is performed in this manner, critical information such as facial expression of an anonymized face becomes different from information contained in an original video, and also, personal identification information overlooked during face detection may remain on the original video.

Therefore, a data obfuscation technique for generating obfuscated data by obfuscating the original data such that a result of inputting the original data into a learning model and a result of inputting the obfuscated data into the learning model are same as or similar to each other is in development.

However, if a user learning network is trained by using the obfuscated data in order to recognize such obfuscated data, the user learning network trained with the obfuscated data may not be able to recognize the original data.

In addition, it is not efficient to train the user learning network by using the original data and the obfuscated data at the same time in case the original data with a large amount have been accumulated.

SUMMARY OF THE DISCLOSURE

It is an object of the present disclosure to solve all the aforementioned problems.

It is another object of the present disclosure to allow inference on original data by a user learning network trained with obfuscated data, e.g., anonymized data or concealed data.

It is still another object of the present disclosure to train the user learning network by using both of the obfuscated data and original data.

In order to accomplish the objects above, distinctive structures of the present disclosure are described as follows.

In accordance with one aspect of the present disclosure, there is provided a method for training a user learning network to be used for recognizing obfuscated data, created by obfuscating original data through an obfuscation network having been trained to obfuscate the original data to generate the obfuscated data such that a trained provider learning network recognizes the obfuscated data as same as the original data and such that the original data is indistinguishable from the obfuscated data, to protect personal information, including steps of: (a) a user learning device performing or supporting another device to perform (i) a process of acquiring (1_1)-st obfuscated data for training to (1_m)-th obfuscated data for training from a data provider, wherein an obfuscation network generates the (1_1)-st obfuscated data for training to the (1_m)-th obfuscated data for training respectively by obfuscating (1_1)-st original data for training to (1_m)-th original data for training and wherein m is an integer equal to or greater than 1, (ii) a process of inputting (1_i)-th obfuscated data for training, among the (1_1)-st obfuscated data for training to the (1_m)-th obfuscated data for training, into a user learning network, to thereby allow the user learning network to apply a learning operation to the (1_i)-th obfuscated data for training and thus to generate first characteristic information for training, via at least one user task layer, to be used for performing a task of the user learning network, and at least one first user batch normalizing layer which adjusts a first average and a first variance of first outputs from the at least one user task layer, and (iii) a process of updating task parameters of the at least one user task layer and first batch parameters of the at least one first user batch normalizing layer such that a first error, calculated by referring to (1) the first characteristic information for training or a first task specific output for training created by using the first characteristic information for training and (2) a first ground truth of the (1_i)-th obfuscated data for training, is minimized, to thereby train the user learning network; and (b) the user learning device performing or supporting another device to perform (i) a process of acquiring (2_1)-st original data for training to (2_n)-th original data for training from a user, wherein n is an integer equal to or greater than 1, (ii) a process of inputting (2_j)-th original data for training, among the (2_1)-st original data for training to the (2_n)-th original data for training, into the user learning network, to thereby allow the user learning network to apply the learning operation to the (2_j)-th original data for training and thus to generate second characteristic information for training, via the at least one user task layer and at least one second user batch normalizing layer which adjusts a second average and a second variance of second outputs from the at least one user task layer, and (iii) a process of updating the task parameters of the at least one user task layer and second batch parameters of the at least one second user batch normalizing layer such that a second error, calculated by referring to (1) the second characteristic information for training or a second task specific output for training created by using the second characteristic information for training and (2) a second ground truth of the (2_j)-th original data for training, is minimized, to thereby train the user learning network.

As one example, the method further includes a step of: (c) the user learning device performing or supporting another device to perform (i) a process of acquiring (3_1)-st original data for training to (3_o)-th original data for training from the data provider, wherein o is an integer equal to or greater than 1 and equal to or less than m and wherein the (3_1)-st original data for training to the (3_o)-th original data for training are at least part of the (1_1)-st original data for training to the (1_m)-th original data for training, (ii) a process of inputting (3_k)-th original data for training, among the (3_1)-st original data for training to the (3_o)-th original data for training into the user learning network, to thereby allow the user learning network to apply the learning operation to the (3_k)-th original data for training and thus to generate third characteristic information for training, via the at least one user task layer and the at least one second user batch normalizing layer, and (iii) a process of updating the task parameters of the at least one user task layer and the second batch parameters of the at least one second user batch normalizing layer such that a third error, calculated by referring to (1) the third characteristic information for training or a third task specific output for training created by using the third characteristic information for training and (2) a third ground truth of the (3_k)-th original data for training, is minimized, to thereby train the user learning network.

As one example, the method further includes a step of (d) the user learning device performing or supporting another device to perform (i) a process of acquiring (4_1)-st original data for training to (4_p)-th original data for training from the user, wherein p is an integer equal to or greater than 1, (ii) a process of inputting (4_s)-th original data for training, among the (4_1)-st original data for training to the (4_p)-th original data for training, into the user learning network, to thereby allow the user learning network to apply the learning operation to the (4_s)-th original data for training and thus to generate fourth characteristic information for training, via the at least one user task layer and the at least one second user batch normalizing layer, (iii) a process of inputting the (4_s)-th original data for training into the obfuscation network, to thereby allow the obfuscation network to obfuscate the (4_s)-th original data for training and thus to generate (4_s)-th obfuscated data for training, (iv) a process of inputting the (4_s)-th obfuscated data for training into the trained provider learning network, to thereby allow the trained provider learning network to apply the learning operation to the (4_s)-th obfuscated data for training and thus to generate fifth characteristic information for training, and (v) a process of updating the task parameters of the at least one user task layer and the second batch parameters of the at least one second user batch normalizing layer such that a fourth error, calculated by referring to the (v-1) the fourth characteristic information for training and the fifth characteristic information for training or (v-2) (v-2-a) a fourth task specific output for training created by using the fourth characteristic information for training and (v-2-b) a fifth task specific output for training created by using the fifth characteristic information for training, is minimized, to thereby train the user learning network.

As one example, the (4_1)-st original data for training to the (4_p)-th original data for training are unlabeled data whose ground truths are not labeled, and wherein the user learning device uses or supports another device to use the fifth characteristic information for training or the fifth task specific output for training as pseudo ground truths of the (4_s)-th original data for training which are at least part of the unlabeled data.

As one example, a provider learning device has trained the obfuscation network by performing or supporting another device to perform (i) a process of inputting sixth original data for training into the obfuscation network, to thereby allow the obfuscation network to obfuscate the sixth original data for training and thus to generate sixth obfuscated data for training, (ii) (ii-1) a process of inputting the sixth obfuscated data for training into the trained provider learning network, to thereby allow the trained provider learning network to apply the learning operation to the sixth obfuscated data for training and thus to generate sixth characteristic information for training and (ii-2) a process of inputting the sixth original data for training into the trained provider learning network, to thereby allow the trained provider learning network to apply the learning operation to the sixth original data for training and thus to generate seventh characteristic information for training, and (iii) a process of training the obfuscation network such that a sixth error, calculated by referring to the sixth characteristic information for training and the seventh characteristic information for training or by referring to a sixth task specific output for training created by using the sixth characteristic information for training, is minimized and such that a seventh error, calculated by referring to the sixth original data for training and the sixth obfuscated data for training, is maximized.

As one example, the trained provider learning network includes a first trained provider learning network to a u-th trained provider learning network performing respective provider tasks different from one another and wherein u is an integer equal to or greater than 1, and wherein the provider learning device performs or supports another device to perform a process of training the obfuscation network by using an average error created by averaging provider network errors respectively corresponding to the first trained provider learning network to the u-th trained provider learning network or a process of training the obfuscation network by sequentially using the first trained provider learning network to the u-th trained provider learning network.

As one example, a provider learning device has trained the obfuscation network by performing or supporting another device to perform (i) a process of inputting eighth original data for training into the obfuscation network, to thereby allow the obfuscation network to obfuscate the eighth original data for training and thus to generate eighth obfuscated data for training, (ii) (ii-1) a process of inputting the eighth obfuscated data for training into the trained provider learning network, to thereby allow the trained provider learning network to apply the learning operation to the eighth obfuscated data for training and thus to generate eighth characteristic information for training, via at least one provider task layer and at least one third provider batch normalizing layer which adjusts a third average and a third variance of third outputs from the at least one provider task layer and (ii-2) a process of inputting the eighth original data for training into the trained provider learning network, to thereby allow the trained provider learning network to apply the learning operation to the eighth original data for training and thus to generate ninth characteristic information for training, via the at least one provider task layer and at least one fourth provider batch normalizing layer which adjusts a fourth average and a fourth variance of fourth outputs from the at least one provider task layer, (iii) a process of training the obfuscation network such that at least one of (iii-1) an eighth error, calculated by referring to the eighth characteristic information for training and the ninth characteristic information for training, and (iii-2) a ninth error, calculated by referring to an eighth task specific output for training created by using the eighth characteristic information for training, is minimized and such that a tenth error, calculated by referring to the eighth original data for training and the eighth obfuscated data for training, is maximized.

As one example, the user learning network includes a first user learning network to a t-th user learning network performing respective tasks different from one another and wherein t is an integer equal to or greater than 1, and wherein the user learning device performs or supports another device to perform a process of training the first user learning network to the t-th user learning network such that user network errors respectively corresponding to the first user learning network to the t-th user learning network are minimized or a process of training the first user learning network to the t-th user learning network such that an average error created by averaging the user network errors is minimized.

In accordance with another aspect of the present disclosure, there is provided a method for testing a user learning network trained to recognize obfuscated data, created by obfuscating original data through an obfuscation network having been trained to obfuscate the original data such that a trained provider learning network recognizes the obfuscated data as same as the original data and such that the original data is indistinguishable from the obfuscated data, to protect personal information, including steps of: (a) on condition that a user learning device has trained a user learning network by performing or supporting another device to perform (i) a process of acquiring (1_1)-st obfuscated data for training to (1_m)-th obfuscated data for training from a data provider, wherein an obfuscation network generates the (1_1)-st obfuscated data for training to the (1_m)-th obfuscated data for training respectively by obfuscating (1_1)-st original data for training to (1_m)-th original data for training and wherein m is an integer equal to or greater than 1, (ii) a process of inputting (1_i)-th obfuscated data for training, among the (1_1)-st obfuscated data for training to the (1_m)-th obfuscated data for training, into the user learning network, to thereby allow the user learning network to apply a learning operation to the (1_i)-th obfuscated data for training and thus to generate first characteristic information for training, via at least one user task layer, to be used for performing tasks of the user learning network, and at least one first user batch normalizing layer which adjusts a first average and a first variance of first outputs from the at least one user task layer, (iii) a process of updating task parameters of the at least one user task layer and first batch parameters of the at least one first user batch normalizing layer such that a first error, calculated by referring to (1) the first characteristic information for training or a first task specific output for training created by using the first characteristic information for training and (2) a first ground truth of the (1_i)-th obfuscated data for training, is minimized, (iv) a process of acquiring (2_1)-st original data for training to (2_n)-th original data for training from a user, wherein n is an integer equal to or greater than 1, (v) a process of inputting (2_j)-th original data for training, among the (2_1)-st original data for training to the (2_n)-th original data for training, into the user learning network, to thereby allow the user learning network to apply the learning operation to the (2_j)-th original data for training and thus to generate second characteristic information for training, via the at least one user task layer and at least one second user batch normalizing layer which adjusts a second average and a second variance of second outputs from the at least one user task layer, and (vi) a process of updating the task parameters of the at least one user task layer and second batch parameters of the at least one second user batch normalizing layer such that a second error, calculated by referring to (1) the second characteristic information for training or a second task specific output for training created by using the second characteristic information for training and (2) a second ground truth of the (2_j)-th original data for training, is minimized, to thereby train the user learning network, a testing device performing or supporting another device to perform a process of acquiring test data; and (b) the testing device performing or supporting another device to perform (i) if the test data is determined as original data for testing, a process of inputting the test data into the user learning network, to thereby allow the user learning network to apply the learning operation to the test data and thus to generate first characteristic information for testing, via the at least one user task layer and the at least one second user batch normalizing layer and (ii) if the test data is determined as obfuscated data for testing, a process of inputting the test data into the user learning network, to thereby allow the user learning network to apply the learning operation to the test data and thus to generate second characteristic information for testing, via the at least one user task layer and the at least one first user batch normalizing layer.

In accordance with still another aspect of the present disclosure, there is provided a user learning device for training a user learning network to be used for recognizing obfuscated data, created by obfuscating original data through an obfuscation network having been trained to obfuscate the original data to generate the obfuscated data such that a trained provider learning network recognizes the obfuscated data as same as the original data and such that the original data is indistinguishable from the obfuscated data, to protect personal information, including: at least one memory that stores instructions; and at least one processor configured to execute the instructions to perform or support another device to perform: (I) (i) a process of acquiring (1_1)-st obfuscated data for training to (1_m)-th obfuscated data for training from a data provider, wherein an obfuscation network generates the (1_1)-st obfuscated data for training to the (1_m)-th obfuscated data for training respectively by obfuscating (1_1)-st original data for training to (1_m)-th original data for training and wherein m is an integer equal to or greater than 1, (ii) a process of inputting (1_i)-th obfuscated data for training, among the (1_1)-st obfuscated data for training to the (1_m)-th obfuscated data for training, into a user learning network, to thereby allow the user learning network to apply a learning operation to the (1_i)-th obfuscated data for training and thus to generate first characteristic information for training, via at least one user task layer, to be used for performing a task of the user learning network, and at least one first user batch normalizing layer which adjusts a first average and a first variance of first outputs from the at least one user task layer, and (iii) a process of updating task parameters of the at least one user task layer and first batch parameters of the at least one first user batch normalizing layer such that a first error, calculated by referring to (1) the first characteristic information for training or a first task specific output for training created by using the first characteristic information for training and (2) a first ground truth of the (1_i)-th obfuscated data for training, is minimized, to thereby train the user learning network and (II) (i) a process of acquiring (2_1)-st original data for training to (2_n)-th original data for training from a user, wherein n is an integer equal to or greater than 1, (ii) a process of inputting (2_j)-th original data for training, among the (2_1)-st original data for training to the (2_n)-th original data for training, into the user learning network, to thereby allow the user learning network to apply the learning operation to the (2_j)-th original data for training and thus to generate second characteristic information for training, via the at least one user task layer and at least one second user batch normalizing layer which adjusts a second average and a second variance of second outputs from the at least one user task layer, and (iii) a process of updating the task parameters of the at least one user task layer and second batch parameters of the at least one second user batch normalizing layer such that a second error, calculated by referring to (1) the second characteristic information for training or a second task specific output for training created by using the second characteristic information for training and (2) a second ground truth of the (2_j)-th original data for training, is minimized, to thereby train the user learning network.

As one example, the processor further performs or supports another device to perform: (III) (i) a process of acquiring (3_1)-st original data for training to (3_o)-th original data for training from the data provider, wherein o is an integer equal to or greater than 1 and equal to or less than m and wherein the (3_1)-st original data for training to the (3_o)-th original data for training are at least part of the (1_1)-st original data for training to the (1_m)-th original data for training, (ii) a process of inputting (3_k)-th original data for training, among the (3_1)-st original data for training to the (3_o)-th original data for training into the user learning network, to thereby allow the user learning network to apply the learning operation to the (3_k)-th original data for training and thus to generate third characteristic information for training, via the at least one user task layer and the at least one second user batch normalizing layer, and (iii) a process of updating the task parameters of the at least one user task layer and the second batch parameters of the at least one second user batch normalizing layer such that a third error, calculated by referring to (1) the third characteristic information for training or a third task specific output for training created by using the third characteristic information for training and (2) a third ground truth of the (3_k)-th original data for training, is minimized, to thereby train the user learning network.

As one example, the processor further performs or supports another device to perform: (IV) (i) a process of acquiring (4_1)-st original data for training to (4_p)-th original data for training from the user, wherein p is an integer equal to or greater than 1, (ii) a process of inputting (4_s)-th original data for training, among the (4_1)-st original data for training to the (4_p)-th original data for training, into the user learning network, to thereby allow the user learning network to apply the learning operation to the (4_s)-th original data for training and thus to generate fourth characteristic information for training, via the at least one user task layer and the at least one second user batch normalizing layer, (iii) a process of inputting the (4_s)-th original data for training into the obfuscation network, to thereby allow the obfuscation network to obfuscate the (4_s)-th original data for training and thus to generate (4_s)-th obfuscated data for training, (iv) a process of inputting the (4_s)-th obfuscated data for training into the trained provider learning network, to thereby allow the trained provider learning network to apply the learning operation to the (4_s)-th obfuscated data for training and thus to generate fifth characteristic information for training, and (v) a process of updating the task parameters of the at least one user task layer and the second batch parameters of the at least one second user batch normalizing layer such that a fourth error, calculated by referring to the (v-1) the fourth characteristic information for training and the fifth characteristic information for training or (v-2) (v-2-a) a fourth task specific output for training created by using the fourth characteristic information for training and (v-2-b) a fifth task specific output for training created by using the fifth characteristic information for training, is minimized, to thereby train the user learning network.

As one example, the (4_1)-st original data for training to the (4_p)-th original data for training are unlabeled data whose ground truths are not labeled, and wherein the processor uses or supports another device to use the fifth characteristic information for training or the fifth task specific output for training as pseudo ground truths of the (4_s)-th original data for training which are at least part of the unlabeled data.

As one example, a provider learning device has trained the obfuscation network by performing or supporting another device to perform (i) a process of inputting sixth original data for training into the obfuscation network, to thereby allow the obfuscation network to obfuscate the sixth original data for training and thus to generate sixth obfuscated data for training, (ii) (ii-1) a process of inputting the sixth obfuscated data for training into the trained provider learning network, to thereby allow the trained provider learning network to apply the learning operation to the sixth obfuscated data for training and thus to generate sixth characteristic information for training and (ii-2) a process of inputting the sixth original data for training into the trained provider learning network, to thereby allow the trained provider learning network to apply the learning operation to the sixth original data for training and thus to generate seventh characteristic information for training, and (iii) a process of training the obfuscation network such that a sixth error, calculated by referring to the sixth characteristic information for training and the seventh characteristic information for training or by referring to a sixth task specific output for training created by using the sixth characteristic information for training, is minimized and such that a seventh error, calculated by referring to the sixth original data for training and the sixth obfuscated data for training, is maximized.

As one example, the trained provider learning network includes a first trained provider learning network to a u-th trained provider learning network performing respective provider tasks different from one another and wherein u is an integer equal to or greater than 1, and wherein the provider learning device performs or supports another device to perform a process of training the obfuscation network by using an average error created by averaging provider network errors respectively corresponding to the first trained provider learning network to the u-th trained provider learning network or a process of training the obfuscation network by sequentially using the first trained provider learning network to the u-th trained provider learning network.

As one example, a provider learning device has trained the obfuscation network by performing or supporting another device to perform (i) a process of inputting eighth original data for training into the obfuscation network, to thereby allow the obfuscation network to obfuscate the eighth original data for training and thus to generate eighth obfuscated data for training, (ii) (ii-1) a process of inputting the eighth obfuscated data for training into the trained provider learning network, to thereby allow the trained provider learning network to apply the learning operation to the eighth obfuscated data for training and thus to generate eighth characteristic information for training, via at least one provider task layer and at least one third provider batch normalizing layer which adjusts a third average and a third variance of third outputs from the at least one provider task layer and (ii-2) a process of inputting the eighth original data for training into the trained provider learning network, to thereby allow the trained provider learning network to apply the learning operation to the eighth original data for training and thus to generate ninth characteristic information for training, via the at least one provider task layer and at least one fourth provider batch normalizing layer which adjusts a fourth average and a fourth variance of fourth outputs from the at least one provider task layer, (iii) a process of training the obfuscation network such that at least one of (iii-1) an eighth error, calculated by referring to the eighth characteristic information for training and the ninth characteristic information for training, and (iii-2) a ninth error, calculated by referring to an eighth task specific output for training created by using the eighth characteristic information for training, is minimized and such that a tenth error, calculated by referring to the eighth original data for training and the eighth obfuscated data for training, is maximized.

As one example, the user learning network includes a first user learning network to a t-th user learning network performing respective tasks different from one another and wherein t is an integer equal to or greater than 1, and wherein the processor performs or supports another device to perform a process of training the first user learning network to the t-th user learning network such that user network errors respectively corresponding to the first user learning network to the t-th user learning network are minimized or a process of training the first user learning network to the t-th user learning network such that an average error created by averaging the user network errors is minimized.

In accordance with still yet another aspect of the present disclosure, there is provided a testing device for testing a user learning network trained to recognize obfuscated data, created by obfuscating original data through an obfuscation network having been trained to obfuscate the original data such that a trained provider learning network recognizes the obfuscated data as same as the original data and such that the original data is indistinguishable from the obfuscated data, to protect personal information, including: at least one memory that stores instructions; and at least one processor configured to execute the instructions to perform or support another device to perform: (I) on condition that a user learning device has trained a user learning network by performing or supporting another device to perform (i) a process of acquiring $(1\_1)$-st obfuscated data for training to $(1\_m)$-th obfuscated data for training from a data provider, wherein an obfuscation network generates the $(1\_1)$-st obfuscated data for training to the $(1\_m)$-th obfuscated data for training respectively by obfuscating $(1\_1)$-st original data for training to $(1\_m)$-th original data for training and wherein m is an integer equal to or greater than 1, (ii) a process of inputting $(1\_i)$-th obfuscated data for training, among the $(1\_1)$-st obfuscated data for training to the $(1\_m)$-th obfuscated data for training, into the user learning network, to thereby allow the user learning network to apply a learning operation to the $(1\_i)$-th obfuscated data for training and thus to generate first characteristic information for training, via at least one user task layer, to be used for performing tasks of the user learning network, and at least one first user batch normalizing layer which adjusts a first average and a first variance of first outputs from the at least one user task layer, (iii) a process of updating task parameters of the at least one user task layer and first batch parameters of the at least one first user batch normalizing layer such that a first error, calculated by referring to (1) the first characteristic information for training or a first task specific output for training created by using the first characteristic information for training and (2) a first ground truth of the $(1\_i)$-th obfuscated data for training, is minimized, (iv) a process of acquiring $(2\_1)$-st original data for training to $(2\_n)$-th original data for training from a user, wherein n is an integer equal to or greater than 1, (v) a process of inputting $(2\_j)$-th original data for training, among the $(2\_1)$-st original data for training to the $(2\_n)$-th original data for training, into the user learning network, to thereby allow the user learning network to apply the learning operation to the $(2\_j)$-th original data for training and thus to generate second characteristic information for training, via the at least one user task layer and at least one second user batch normalizing layer which adjusts a second average and a second variance of second outputs from the at least one user task layer, and (vi) a process of updating the task parameters of the at least one user task layer and second batch parameters of the at least one second user batch normalizing layer such that a second error, calculated by referring to (1) the second characteristic information for training or a second task specific output for training created by using the second characteristic information for training and (2) a second ground truth of the $(2\_j)$-th original data for training, is minimized, to thereby train the user learning network, a process of acquiring test data, and (II) (i) if the test data is determined as original data for testing, a process of inputting the test data into the user learning network, to thereby allow the user learning network to apply the learning operation to the test data and thus to generate first characteristic information for testing, via the at least one user task layer and the at least one second user batch normalizing layer and (ii) if the test data is determined as obfuscated data for testing, a process of inputting the test data into the user learning network, to thereby allow the user learning network to apply the learning operation to the test data and thus to generate second characteristic information for testing, via the at least one user task layer and the at least one first user batch normalizing layer.

In addition, recordable media that are readable by a computer for storing a computer program to execute the method of the present disclosure are further provided.

BRIEF DESCRIPTION OF THE DRAWINGS

The following drawings to be used for explaining example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
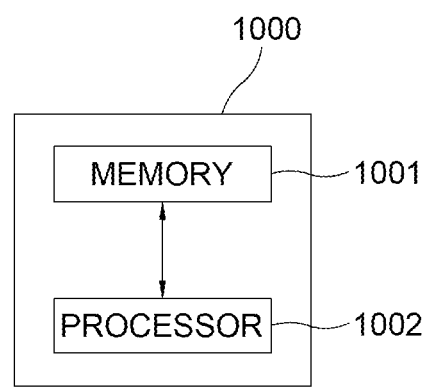
FIG. 1 is a drawing schematically illustrating a user learning device for training a user learning network to be used for recognizing obfuscated data created by obfuscating, e.g., anonymizing or concealing, original data to protect personal information in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects.

For reference, throughout the present disclosure, the phrase "for training" or "training" is added for terms related to training processes, and the phrase "for testing" or "testing" is added for terms related to testing processes, to avoid possible confusion.

To allow those skilled in the art to carry out the present disclosure easily, the example embodiments of the present disclosure will be explained in detail as shown below by referring to attached drawings.

FIG. 1 is a drawing schematically illustrating a user learning device for training a user learning network to be used for recognizing obfuscated data created by obfuscating, e.g., anonymizing or concealing, original data to protect personal information in accordance with one example embodiment of the present disclosure. Herein, the user learning network may be a learning network of a user which performs a user task, i.e., a task of the user.

By referring to FIG. 1, the user learning device 1000 may include a memory 1001 for storing instructions to train the user learning network to be used for recognizing the obfuscated data, created by obfuscating the original data to protect the personal information, and a processor 1002 for performing processes to train the user learning network according to the instructions in the memory 1001. Herein, the user learning device 1000 may be a learning device used by the user.

Specifically, the user learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

A method for training the user learning network to be used for recognizing the obfuscated data created by obfuscating, e.g., anonymizing or concealing, the original data to protect the personal information by using the user learning device 1000 in accordance with one example embodiment of the present disclosure is described as follows.

Figure 2:
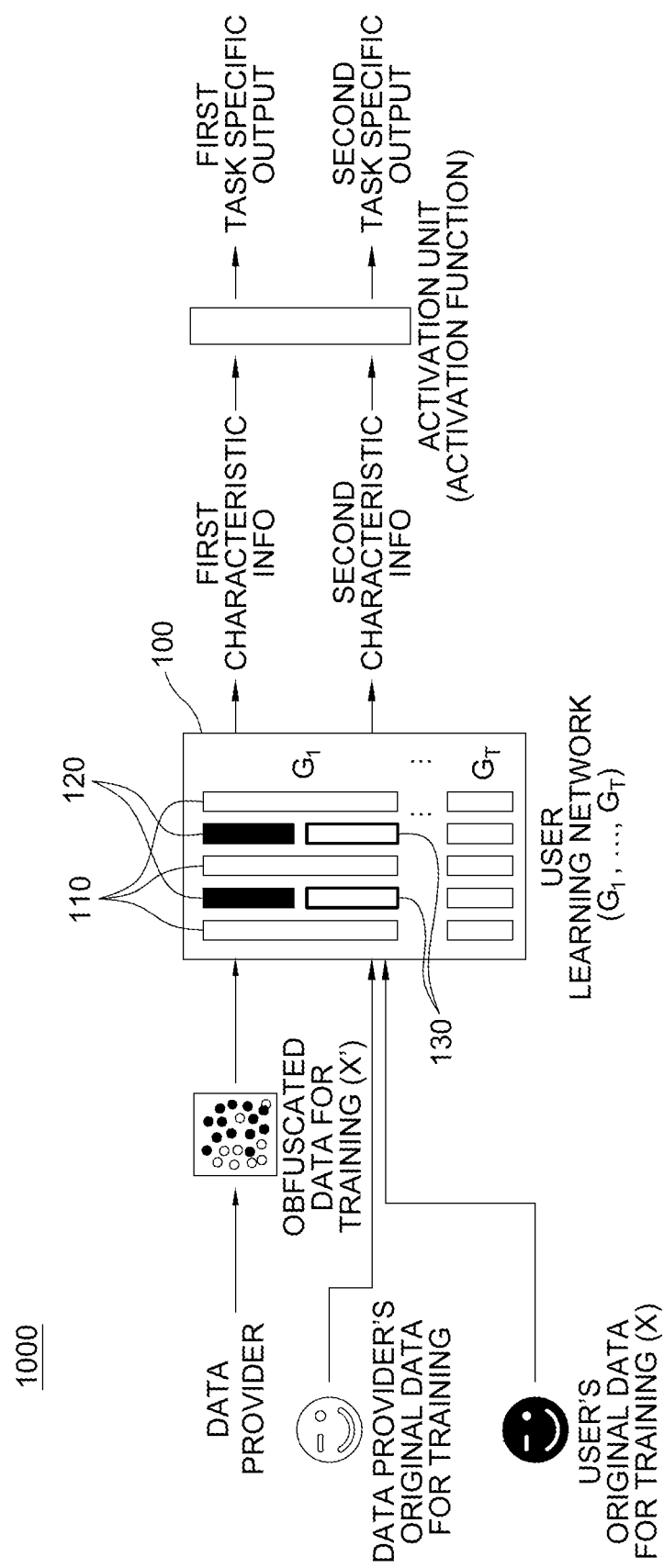
FIG. 2 is a drawing schematically illustrating a method for training the user learning network to be used for recognizing the obfuscated data created by obfuscating, e.g., anonymizing or concealing, the original data to protect the personal information in accordance with one example embodiment of the present disclosure.

FIG. 2 is a drawing schematically illustrating a method for training the user learning network to be used for recognizing the obfuscated data created by obfuscating, e.g., anonymizing or concealing, the original data to protect the personal information in accordance with one example embodiment of the present disclosure.

First, the user learning device 1000 may perform or support another device to perform a process of acquiring (1_1)-st obfuscated data for training to (1_m)-th obfuscated data for training from a data provider. Herein, m may be an integer equal to or greater than 1.

Herein, the (1_1)-st obfuscated data for training to the (1_m)-th obfuscated data for training may be created by obfuscating, e.g., anonymizing or concealing, (1_1)-st original data for training to (1_m)-th original data for training in order to protect the personal information.

And an obfuscation network may be used for obfuscating, e.g., anonymizing or concealing, the (1_1)-st original data for training to the (1_m)-th original data for training. Herein, the obfuscation network may be a deep learning network that has been trained to obfuscate the original data to thereby generate the obfuscated data such that a trained provider learning network (not illustrated in FIG. 2 but illustrated in FIGS. 4 and 5) recognizes the obfuscated data as same as the original data and such that the original data is indistinguishable from the obfuscated data. Processes of training the obfuscation network will be described later. Herein, the trained provider learning network, to be described later by referring to FIGS. 4 and 5, may be a learning network of the data provider which performs a provider task, i.e., a task of the data provider.

That is, the data provider may generate the (1_1)-st obfuscated data for training to the (1_m)-th obfuscated data for training by respectively obfuscating, i.e., anonymizing or concealing, the (1_1)-st original data for training to the (1_m)-th original data for training via the obfuscation network and may transmit the (1_1)-st obfuscated data for training to the (1_m)-th obfuscated data for training to the user who has an intention of training the user learning network 100, to thereby allow the user learning device to acquire the (1_1)-st obfuscated data for training to the (1_m)-th obfuscated data for training to be used for training the user learning network 100.

Also, the user learning device 1000 may acquire each of first ground truths of each of the (1_1)-st obfuscated data for training to the (1_m)-th obfuscated data for training from the data provider. Herein, each of the first ground truths may be each of ground truths of each of the (1_1)-st original data for training to the (1_m)-th original data for training.

Next, the user learning device 1000 may perform or support another device to perform a process of acquiring (2_1)-st original data for training to (2_n)-th original data for training from the user. Herein, n may be an integer equal to or greater than 1.

Herein, the (2_1)-st original data for training to the (2_n)-th original data for training may be training data held by the user in order to train the user learning network 100, and each of second ground truths of each of the (2_1)-st original data for training to the (2_n)-th original data for training may have been generated.

Next, the user learning device 1000 may train the user learning network 100 by using (i) the (1_1)-st obfuscated data for training to the (1_m)-th obfuscated data for training acquired from the data provider and (ii) the (2_1)-st original data for training to the (2_n)-th original data for training acquired from the user.

That is, the user learning device 1000 may perform or support another device to perform a process of inputting (1_i)-th obfuscated data for training, among the (1_1)-st obfuscated data for training to the (1_m)-th obfuscated data for training acquired from the data provider, into the user learning network 100, to thereby allow the user learning network 100 to apply a learning operation to the (1_i)-th obfuscated data for training and thus to generate first characteristic information for training, via at least one user task layer 110 and at least one first user batch normalizing layer 120. Herein, the at least one user task layer 110 may be used for performing the user task of the user learning network 100, and further, the at least one first user batch normalizing layer 120 may be used for adjusting a first average and a first variance of first outputs from the at least one user task layer 110. Further, the user learning network 100 may include the at least one user task layer 110 and the at least one first user batch normalizing layer 120. And the user learning device 1000 may perform or support another device to perform a process of updating task parameters of the at least one user task layer 110 and first batch parameters of the at least one first user batch normalizing layer 120 such that a first error, calculated by referring to (1) the first characteristic information for training or a first task specific output for training created by using the first characteristic information for training and (2) a first ground truth of the (1_i)-th obfuscated data for training, is minimized, to thereby train the user learning network 100. Herein, the user learning network 100 may be trained via backpropagation according to a loss function created by using the first error.

Also, the user learning device 1000 may perform or support another device to perform a process of inputting (2_j)-th original data for training, among the (2_1)-st original data for training to the (2_n)-th original data for training acquired from the user, into the user learning network 100, to thereby allow the user learning network 100 to apply the learning operation to the (2_j)-th original data for training and thus to generate second characteristic information for training, via the at least one user task layer 110 and at least one second user batch normalizing layer 130 which adjusts a second average and a second variance of second outputs from the at least one user task layer 110. Herein, the user learning network 100 may include the at least one user task layer 110 and the at least one second user batch normalizing layer 130. And the user learning device 1000 may perform or support another device to perform a process of updating the task parameters of the at least one user task layer 110 and second batch parameters of the at least one second user batch normalizing layer 130 such that a second error, calculated by referring to (1) the second characteristic information for training or a second task specific output for training created by using the second characteristic information for training and (2) a second ground truth of the (2_j)-th original data for training, is minimized, to thereby train the user learning network 100. Herein, the user learning network 100 may be trained via backpropagation according to a loss function created by using the second error.

Training of the user learning network 100 as such may allow characteristic information, common in the (1_i)-th obfuscated data for training and the (2_j)-th original data for training, to be used for training the at least one user task layer 110, which is a shared layer, and may allow differences between the (1_i)-th obfuscated data for training and the (2_j)-th original data for training, for example, the differences among visually natural RGB images and the differences among noise, to be used for respectively training the first user batch normalizing layer 120 and the second user batch normalizing layer 130. Accordingly, the trained user learning network 100 may perform the learning operation respectively on the original data and the obfuscated data.

Herein, the user learning network 100 may include a machine learning network, but the scope of the present disclosure is not limited thereto, and may include any learning networks capable of generating the characteristic information by applying the learning operation to the original data or the obfuscated data. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

And, the characteristic information may be features or logits corresponding to the original data or the obfuscated data. Also, the characteristic information may be feature values related to certain features in the original data or the obfuscated data, or logits including values related to at least one of vectors, matrices, and coordinates related to the certain features. For example, if the original data are facial image data, the result above may be classes, facial features, e.g., laughing expressions, coordinates of facial landmark points, e.g., both end points on far sides of an eye, to be used for face recognition.

Also, the task specific output may be an output of the user task to be performed by the user learning network 100, and may have various results according to the designed user task of the user learning network 100, such as a probability of a class for classification, coordinates resulting from regression for location detection, etc., and an activation function of an activation unit may be applied to the characteristic information outputted from the user learning network 100, to thereby generate the task specific output according to the user task to be performed by the user learning network 100. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the user learning network 100 performs the user task for the classification, the user learning device 1000 may map the characteristic information outputted from the user learning network 100 onto each of classes, to thereby generate one or more probabilities of the original data or the obfuscated data, for each of the classes. Herein, the probabilities for each of the classes may represent probabilities of the characteristic information, outputted for each of the classes from the user learning network 100, being correct. For example, if the original data are the facial image data, a probability of the face having a laughing expression may be outputted as 0.75, and a probability of the face not having the laughing expression may be outputted as 0.25, and the like. Herein, a softmax algorithm may be used for mapping the characteristic information outputted from the user learning network 100 onto each of the classes, but the scope of the present disclosure is not limited thereto, and various algorithms may be used for mapping the characteristic information onto each of the classes.

Also, the at least one user task layer 110 of the user learning network 100 may perform the learning operation to extract the characteristic information from the original data or the obfuscated data, and may include various deep learning layers according to the user task to be performed, for example, a task of a convolutional layer, a task of a deconvolutional layer, a task of a linear layer, etc.

Meanwhile, the user learning network 100 is described above as trained by using (i) the (1_1)-st obfuscated data for training to the (1_m)-th obfuscated data for training acquired from the data provider and (ii) the (2_1)-st original data for training to the (2_n)-th original data for training acquired from the user. However, the user learning network 100 may further be trained by using at least part of the (1_1)-st original data for training to the (1_m)-th original data for training, used for creating the (1_1)-st obfuscated data for training to the (1_m)-th obfuscated data for training, acquired from the data provider.

That is, the user learning device 1000 may acquire (3_1)-st original data for training to (3_o)-th original data for training, which are at least part of the (1_1)-st original data for training to the (1_m)-th original data for training, from the data provider. And the user learning device 1000 may perform or support another device to perform a process of inputting (3_k)-th original data for training, among the (3_1)-st original data for training to the (3_o)-th original data for training, into the user learning network 100, to thereby allow the user learning network 100 to apply the learning operation to the (3_k)-th original data for training and thus to generate third characteristic information for training, via the at least one user task layer 110 and the at least one second user batch normalizing layer 130. Then the user learning device 1000 may perform or support another device to perform a process of updating the task parameters of the at least one user task layer 110 and the second batch parameters of the at least one second user batch normalizing layer 130 such that a third error, calculated by referring to (1) the third characteristic information for training or a third task specific output for training created by using the third characteristic information for training and (2) a third ground truth of the (3_k)-th original data for training, is minimized, to thereby train the user learning network 100.

Herein, the single user learning network is described above as being trained, however, as another example, a plurality of user learning networks to be used for performing respective user tasks different from one another may also be trained.

That is, on condition that the user learning network 100 is configured as a first user learning network to a t-th user learning network $G_1, G_2, \ldots,$ and $G_t$ respectively including at least one user task layer and at least one user batch normalizing layer, the user learning device 1000 may perform or support another device to perform (i) a process of training the first user learning network to the t-th user learning network $G_1, G_2, \ldots,$ and $G_t$ such that user network errors respectively corresponding to the first user learning network to the t-th user learning network $G_1, G_2, \ldots,$ and $G_t$ are minimized or (ii) a process of training the first user learning network to the t-th user learning network $G_1, G_2, \ldots,$ and $G_t$ such that an average error created by averaging said user network errors is minimized. Herein, t may be an integer equal to or greater than 1.

In the above description, (1) original data for training and obfuscated data for training are inputted into the user learning network 100 and (2) the user learning network 100 is trained by referring to (2-a) characteristic information for training outputted from the user learning network 100 or (2-b) task specific outputs for training created by using the characteristic information for training. However, as another example, the user learning network 100 may be trained by using batch data. That is, after creating (1) a batch of the obfuscated data for training by using multiple pieces of the obfuscated data for training and (2) a batch of the original data for training by using multiple pieces of the original data for training, (i) the batch of the obfuscated data for training and the batch of the original data for training may be inputted into the user learning network 100 and (ii) the user learning network 100 may be trained by using each loss function corresponding to each of the batch of the obfuscated data for training and the batch of the original data for training.

Figure 3:
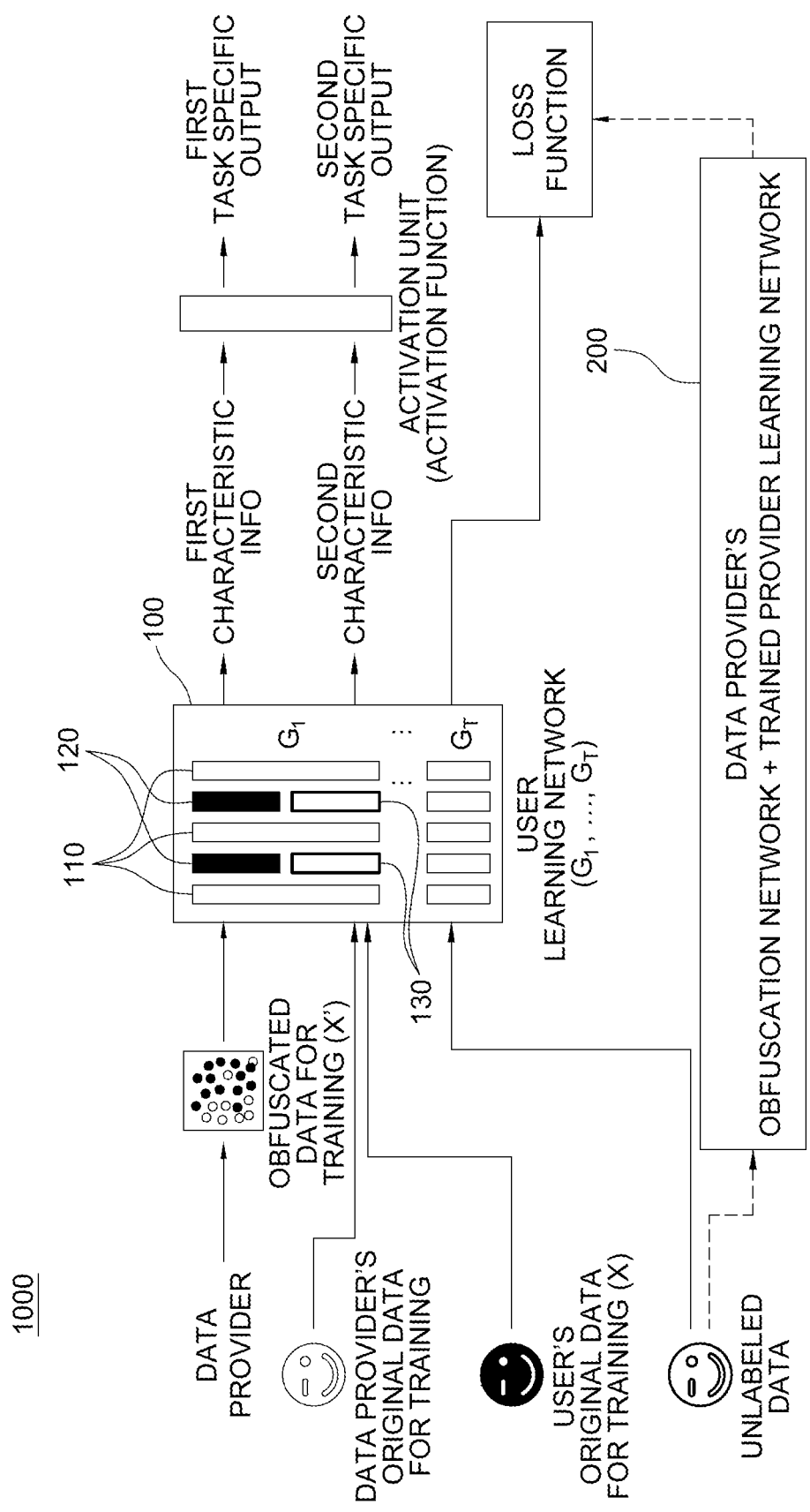
FIG. 3 is a drawing schematically illustrating a method for training the user learning network in accordance with another example embodiment of the present disclosure.

FIG. 3 is a drawing schematically illustrating a method for training the user learning network to be used for recognizing the obfuscated data created by obfuscating, e.g., anonymizing or concealing, the original data to protect the personal information in accordance with another example embodiment of the present disclosure. The method for training the user learning network is described as follows.

In accordance with the method shown in FIG. 3, further to the method shown in FIG. 2, the user learning network may be trained by using unlabeled data the user owns or newly obtained, that is, the original data for training whose ground truths are not generated. Description of training by using the obfuscated data for training and the original data for training shown in FIG. 2 will be omitted, and processes only of training by using the unlabeled data will be described below.

First, the user learning device 1000 may perform or support another device to perform a process of acquiring (4_1)-st original data for training to (4_p)-th original data for training, which are the unlabeled data, from the user. Herein, p may be an integer equal to or greater than 1.

Then the user learning device 1000 may perform or support another device to perform a process of inputting (4_s)-th original data for training, among the (4_1)-st original data for training to the (4_p)-th original data for training, into the user learning network 100, to thereby allow the user learning network 100 to apply the learning operation to the (4_s)-th original data for training and thus to generate fourth characteristic information for training, via the at least one user task layer 110 and the at least one second user batch normalizing layer 130.

And the user learning device 1000 may perform or support another device to perform a process of inputting the (4_s)-th original data for training into a pseudo ground truth generation network 200, to thereby allow the pseudo ground truth generation network 200 to generate a pseudo ground truth of the (4_s)-th original data for training. Herein, the user may acquire the pseudo ground truth generation network 200 from the data provider. And the pseudo ground truth generation network 200 may include the obfuscation network for generating the obfuscated data by obfuscating the original data and the trained provider learning network having been used for training the obfuscation network.

That is, the user learning device 1000 may perform or support another device to perform a process of inputting the (4_s)-th original data for training into the obfuscation network, to thereby allow the obfuscation network to obfuscate the (4_s)-th original data for training and thus to generate (4_s)-th obfuscated data for training. Next, the user learning device 1000 may perform or support another device to perform a process of inputting the (4_s)-th obfuscated data for training into the trained provider learning network, to thereby allow the trained provider learning network to apply the learning operation to the (4_s)-th obfuscated data for training and thus to generate fifth characteristic information for training.

Then the user learning device 1000 may perform or support another device to perform a process of updating the task parameters of the at least one user task layer 110 and the second batch parameters of the at least one second user batch normalizing layer 130 such that a fourth error, calculated by referring to (i) the fourth characteristic information for training and the fifth characteristic information for training or (ii) (ii-1) a fourth task specific output for training created by using the fourth characteristic information for training and (ii-2) a fifth task specific output for training created by using the fifth characteristic information for training, is minimized, to thereby train the user learning network 100. Herein, the fifth characteristic information for training or the fifth task specific output for training may be the pseudo ground truth of the (4_s)-th original data for training which is at least part of the unlabeled data. That is, the user learning device 1000 may perform or support another device to perform a process of training the user learning network 100 via a loss function calculated by using (1) a result of applying the learning operation to the (4_s)-th original data for training by the user learning network 100 and (2) the pseudo ground truth.

Figure 4:
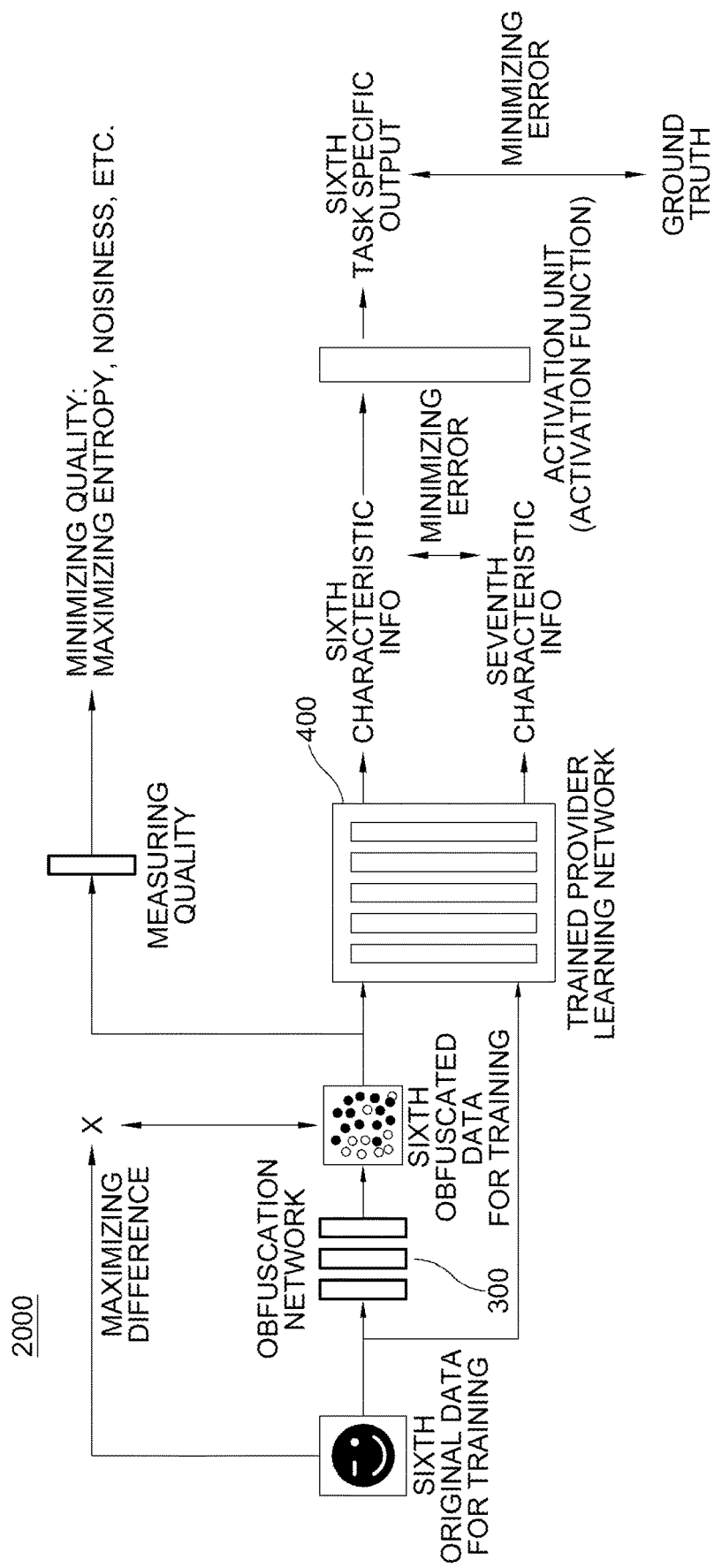
FIG. 4 is a drawing schematically illustrating a method for training an obfuscation network to be used for obfuscating, e.g., anonymizing or concealing, the original data to protect the personal information in accordance with one example embodiment of the present disclosure.

FIG. 4 is a drawing schematically illustrating a method for training the user learning network to be used for recognizing the obfuscated data created by obfuscating, e.g., anonymizing or concealing, the original data to protect the personal information in accordance with another example embodiment of the present disclosure. The method for training the obfuscation network is described by referring to FIG. 4 as follows. The obfuscation network may be trained by the data provider.

If sixth original data for training is acquired, a provider learning device 2000 may perform or support another device to perform a process of inputting the sixth original data for training into the obfuscation network 300, to thereby allow the obfuscation network 300 to obfuscate the sixth original data for training and thus to generate sixth obfuscated data for training. Herein, the provider learning device 2000 may be a learning device used by the data provider.

Herein, the sixth original data for training may be original data for training which is the original data to be used for training, or may be modified data for training generated by modifying the original data for training, and further, the modified data for training may be generated by adding at least one random noise created through a random noise generating network (not illustrated) to the original data for training. As one example, the random noise generating network may be instructed to generate the random noise having a normal distribution $N(0, \sigma)$, and the generated noise may be added to the original data for training, to thereby generate the modified data for training. Also, the modified data for training may be generated by blurring the original data for training, or changing a resolution of the original data for training, as well as using the random noise, but the scope of the present disclosure is not limited thereto, and various ways of modifying the original data for training may be used.

And, the sixth obfuscated data for training may be recognized as data different from the sixth original data for training by a human, but may be recognized as data similar to or same as the sixth original data for training by the trained provider learning network 400.

Meanwhile, as one example, the obfuscation network 300 may include at least one encoder having one or more convolutional layers for applying one or more convolution operations to an image, inputted as training data, and at least one decoder having one or more deconvolutional layers for applying one or more deconvolution operations to at least one feature map outputted from the encoder and thus for generating the obfuscated data for training, but the scope of the present disclosure is not limited thereto, and may include any learning networks having various structures capable of obfuscating the inputted sixth original data for training and thus generating the sixth obfuscated data for training.

And, the provider learning device 2000 may perform or support another device to perform a process of inputting the sixth obfuscated data for training into the trained provider learning network 400 having one or more learned parameters, to thereby allow the trained provider learning network 400 to apply the learning operation to the sixth obfuscated data for training and thus to generate sixth characteristic information for training.

And, the provider learning device 2000 may perform or support another device to perform a process of inputting the sixth original data for training into the trained provider learning network 400, to thereby allow the trained provider learning network 400 to apply the learning operation to the sixth original data for training and thus to generate seventh characteristic information for training.

Herein, the trained provider learning network 400 may include a machine learning network, but the scope of the present disclosure is not limited thereto, and may include any learning networks with learned parameters capable of generating the sixth characteristic information for training by applying the learning operation to the sixth obfuscated data for training and generating the seventh characteristic information for training by applying the learning operation to the sixth original data for training. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be obfuscated, e.g., a subject to be anonymized or concealed, may be personal information included in the original data. Herein, the personal information may include any information related to a person, such as personal identification information, personal medical information, personal biometric information, personal behavioral information, etc.

And, the sixth characteristic information for training and the seventh characteristic information for training may be features or logits respectively corresponding to the sixth obfuscated data for training and the sixth original data for training. Also, the sixth characteristic information for training and the seventh characteristic information for training may be feature values related to certain features included respectively in the sixth obfuscated data for training and the sixth original data for training, or the logits including values related to at least one of vectors, matrices, and coordinates related to the certain features. For example, if the sixth original data for training are facial image data, the result above may be classes for face recognition, facial features, e.g., laughing expressions, coordinates of facial landmark points, e.g., both end points on far sides of an eye.

Thereafter, the provider learning device 2000 may perform or support another device to perform a process of training the obfuscation network 300 such that a sixth error, calculated by referring to (1) the sixth characteristic information for training and the seventh characteristic information for training or (2) a sixth task specific output for training, created by using the sixth characteristic information for training, and a ground truth, corresponding to the sixth task specific output for training, is minimized and such that a seventh error, calculated by referring to the sixth original data for training and the sixth obfuscated data for training, is maximized.

That is, the provider learning device 2000 may perform or support another device to perform a process of training the obfuscation network 300 such that (i) the sixth error, calculated by referring to at least one of (i-1) a (6_1)-st error acquired by referring to the sixth characteristic information for training and the seventh characteristic information for training, and (i-2) a (6_2)-nd error which is an obfuscation loss acquired by referring to the sixth task specific output for training created by using the sixth characteristic information for training and by further referring to the ground truth corresponding to the sixth task specific output for training, is minimized and (ii) the seventh error, calculated by referring to the sixth original data for training and the sixth obfuscated data for training, is maximized. In detail, the provider learning device 2000 may perform or support another device to perform a process of training the obfuscation network 300 (i) by using the seventh error, such that the obfuscation network 300 outputs the sixth obfuscated data for training much different from the sixth original data for training and (ii) by using the sixth error, such that the obfuscation network 300 obfuscates the sixth original data for training to output the sixth obfuscated data for training, in order to allow the trained provider learning network 400 to recognize the sixth obfuscated data for training as same as or similar to the sixth original data for training.

Herein, the provider learning device 2000 may acquire the sixth error by referring to at least one of (i) a difference between the sixth characteristic information for training and the seventh characteristic information for training and (ii) the obfuscation loss which is a difference between the sixth task specific output for training and its corresponding ground truth. As one example, the provider learning device 2000 may acquire the sixth error by referring to a norm or a cosine similarity between the sixth characteristic information for training and the seventh characteristic information for training, but the scope of the present disclosure is not limited thereto, and any various algorithms capable of calculating the difference between the sixth characteristic information for training and the seventh characteristic information for training may be used. Also, the provider learning device 2000 may acquire the seventh error by referring to a difference between the sixth original data for training and the sixth obfuscated data for training.

Also, the provider learning device 2000 may measure at least one quality by referring to at least part of an entropy of the sixth obfuscated data for training and a degree of noise of the sixth obfuscated data for training, and may acquire the sixth error by further referring to the measured quality. That is, the provider learning device 2000 may train the obfuscation network 300 such that the quality of the sixth obfuscated data for training is minimized, for example, such that at least part of the entropy, noise, etc. of the sixth obfuscated data for training is maximized.

And, if the provider learning device 2000 trains the obfuscation network 300 such that the sixth error is minimized and that the seventh error is maximized, the provider learning device 2000 may fix and not update the learned parameters of the trained provider learning network 400, and may proceed with training the obfuscation network 300 only.

Meanwhile, the sixth task specific output for training may be an output of the provider task to be performed by the trained provider learning network 400, and may have various results according to the provider task learned by the trained provider learning network 400, such as a probability of a class for classification, coordinates resulting from regression for location detection, etc., and an activation function of an activation unit may be applied to the sixth characteristic information for training outputted from the trained provider learning network 400, to thereby generate the sixth task specific output for training according to the provider task to be performed by the trained provider learning network 400. Herein, the activation function may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the trained provider learning network 400 performs the provider task for the classification, the provider learning device 2000 may map the sixth characteristic information for training outputted from the trained provider learning network 400 onto each of classes, to thereby generate one or more probabilities of the sixth obfuscated data for training, for each of the classes. Herein, the probabilities for each of the classes may represent probabilities of the sixth characteristic information for training, outputted for each of the classes from the trained provider learning network 400, being correct. For example, if the sixth original data for training are the facial image data, a probability of the face having a laughing expression may be outputted as 0.75, and a probability of the face not having the laughing expression may be outputted as 0.25, and the like. Herein, a softmax algorithm may be used for mapping the sixth characteristic information for training outputted from the trained provider learning network 400 onto each of the classes, but the scope of the present disclosure is not limited thereto, and various algorithms may be used for mapping the sixth characteristic information for training onto each of the classes.

Meanwhile, the seventh error is described above as calculated by referring to the sixth original data for training and the sixth obfuscated data for training, but the scope of the present disclosure is not limited thereto. As another example, a discriminator of a GAN (generative adversarial network) may be used for calculation of the seventh error. That is, the sixth obfuscated data for training may be inputted into the discriminator, to thereby allow the discriminator to output the obfuscation loss representing a degree of the sixth obfuscated data for training being recognized as fake. Herein, said degree may be a score of the sixth obfuscated data for training being recognized as fake.

Herein, the obfuscation network 300 is described above as trained by using the single trained provider learning network 400, however, as another example, the obfuscation network 300 may be trained by using a plurality of trained provider learning networks to be used for performing respective provider tasks different from one another.

That is, the provider learning device 2000 may perform or support another device to perform (i) a process of training the obfuscation network 300 by using an average error created by averaging provider network errors respectively corresponding to a first trained provider learning network to a u-th trained provider learning network or (ii) a process of training the obfuscation network 300 by sequentially using the first trained provider learning network to the u-th trained provider learning network. Herein, u may be an integer equal to or greater than 1.

Figure 5:
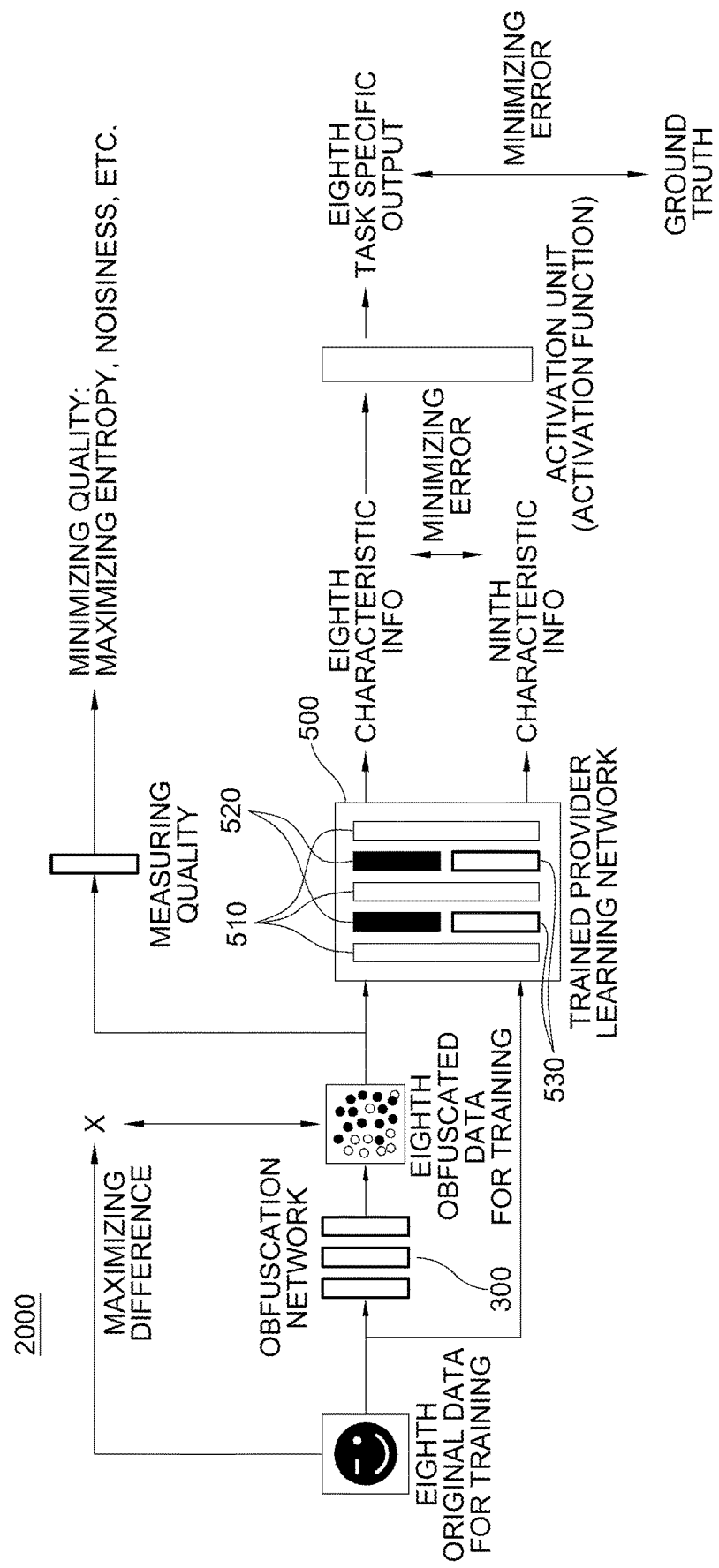
FIG. 5 is a drawing schematically illustrating another method for training the obfuscation network to be used for obfuscating, e.g., anonymizing or concealing, the original data to protect the personal information in accordance with one example embodiment of the present disclosure.

FIG. 5 is a drawing schematically illustrating another method for training the user learning network to be used for recognizing the obfuscated data created by obfuscating, e.g., anonymizing or concealing, the original data to protect the personal information in accordance with another example embodiment of the present disclosure. The method for training the obfuscation network is described by referring to FIG. 5 as follows. The obfuscation network may be trained by the data provider. In the description below, the part easily deducible from the explanation of FIG. 4 will be omitted.

If eighth original data for training is acquired, the provider learning device 2000 may perform or support another device to perform a process of inputting the eighth original data for training into the obfuscation network 300, to thereby allow the obfuscation network 300 to obfuscate the eighth original data for training and thus to generate eighth obfuscated data for training.

And, the provider learning device 2000 may perform or support another device to perform a process of inputting the eighth obfuscated data for training into a trained provider learning network 500, to thereby allow the trained provider learning network 500 to apply the learning operation to the eighth obfuscated data for training and thus to generate eighth characteristic information for training, via at least one provider task layer 510 and at least one third provider batch normalizing layer 520. Herein, the at least one provider task layer 510, which has been trained, may be used for performing the provider task of the trained provider learning network 500 and the at least one third provider batch normalizing layer 520 may be used for adjusting a third average and a third variance of third outputs from the at least one provider task layer 510. Further, the trained provider learning network 500 may include the at least one provider task layer 510 and the at least one third provider batch normalizing layer 520.

Also, the provider learning device 2000 may perform or support another device to perform a process of inputting the eighth original data for training into the trained provider learning network 500, to thereby allow the trained provider learning network 500 to apply the learning operation to the eighth original data for training and thus to generate ninth characteristic information for training, via the at least one provider task layer 510 and at least one fourth provider batch normalizing layer 530 which adjusts a fourth average and a fourth variance of fourth outputs from the at least one provider task layer 510. Herein, the trained provider learning network 500 may include the at least one provider task layer 510 and the at least one fourth provider batch normalizing layer 530.

Thereafter, the provider learning device 2000 may perform or support another device to perform a process of training the obfuscation network 300 such that at least one of (1) an eighth error, calculated by referring to the eighth characteristic information for training and the ninth characteristic information for training, and (2) a ninth error, calculated by referring to an eighth task specific output for training created by using the eighth characteristic information for training and a ground truth corresponding to the eighth task specific output for training, is minimized and such that a tenth error, calculated by referring to the eighth original data for training and the eighth obfuscated data for training, is maximized.

In the processes of training the obfuscation network 300 as such, the trained provider learning network 500 performs the provider task via the at least one provider task layer which is a shared layer and the at least one third provider batch normalizing layer performs batch normalizing of the eighth obfuscated data for training. Further, in the processes of training the obfuscation network 300 as such, the trained provider learning network 500 performs the provider task via the at least one provider task layer and the at least one fourth provider batch normalizing layer performs the batch normalizing of the eighth original data for training. Then, a learning performance of the user learning network for performing the learning operation on both of the original data and the obfuscated data is improved by using the obfuscated data for training generated by the obfuscation network 300 trained as such.

Figure 6:
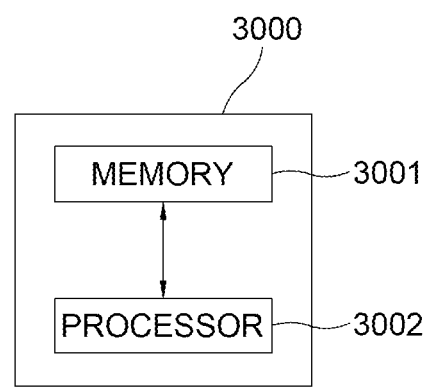
FIG. 6 is a drawing schematically illustrating a testing device for testing the user learning network trained to recognize the obfuscated data in accordance with one example embodiment of the present disclosure.
Figure 7:
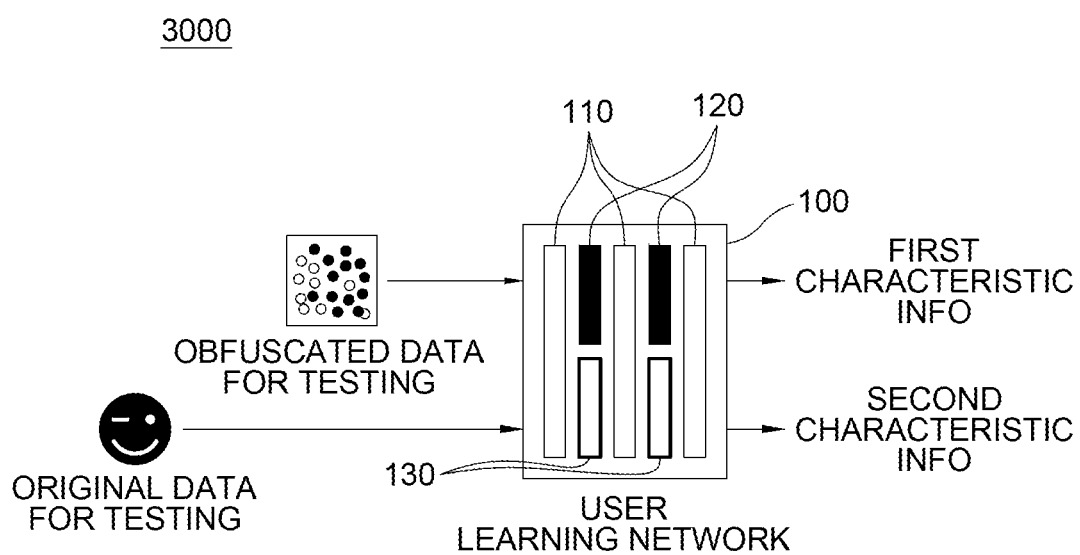
FIG. 7 is a drawing schematically illustrating a method for testing the user learning network trained to recognize the obfuscated data in accordance with one example embodiment of the present disclosure.

FIG. 6 is a drawing schematically illustrating a testing device for testing the user learning network trained to recognize the obfuscated data created by obfuscating, e.g., anonymizing or concealing, the original data to protect the personal information in accordance with one example embodiment of the present disclosure.

By referring to FIG. 6, the testing device 3000 may include a memory 3001 for storing instructions to test the user learning network trained to recognize the obfuscated data, created by obfuscating the original data to protect the personal information, and a processor 3002 for performing processes to test the trained user learning network according to the instructions in the memory 3001.

Specifically, the user learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include operating system (OS) and software configuration of applications that achieve specific purposes.

Such description of the computing device does not exclude an integrated device including any combination of a processor, a memory, a medium, or any other computing components for implementing the present disclosure.

A method for testing the user learning network trained to recognize the obfuscated data created by obfuscating, e.g., anonymizing or concealing, the original data to protect the personal information by using the testing device 3000 in accordance with one example embodiment of the present disclosure is described as follows. In the description below, the part easily deducible from the explanation of FIGS. 2 and 3 will be omitted.

On condition that the user learning network 100 has been trained according to the method for training described above by referring to FIGS. 2 and 3, the testing device 3000 may acquire test data.

And, if the acquired test data is determined as original data for testing, the testing device 3000 may perform or support another device to perform a process of inputting the test data into the user learning network 100, to thereby allow the user learning network 100 to apply the learning operation to the test data and thus to generate first characteristic information for testing, via the at least one user task layer 110 and the at least one second user batch normalizing layer 130.

Also, if the test data is determined as obfuscated data for testing, the testing device 3000 may perform or support another device to perform a process of inputting the test data into the user learning network 100, to thereby allow the user learning network 100 to apply the learning operation to the test data and thus to generate second characteristic information for testing, via the at least one user task layer 110 and the at least one first user batch normalizing layer 120.

The present disclosure has an effect of allowing inference on the original data by the user learning network trained with the obfuscated data, e.g., the anonymized data or the concealed data.

The present disclosure has another effect of training the user learning network by using both of the obfuscated data and the original data.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed:

1. A method for training a user learning network to be used for recognizing obfuscated data, created by obfuscating original data through an obfuscation network having been trained to obfuscate the original data to generate the obfuscated data, wherein a trained provider learning network recognizes the obfuscated data as same as the original data and, wherein the original data is indistinguishable from the obfuscated data, to protect personal information, comprising steps of:

(a) a user learning device performing (i) a process of acquiring (1_1)-st obfuscated data for training to (1_m)-th obfuscated data for training from a data provider, wherein an obfuscation network generates the (1_1)-st obfuscated data for training to the (1_m)-th obfuscated data for training respectively by obfuscating (1_1)-st original data for training to (1_m)-th original data for training and wherein m is an integer equal to or greater than 1, (ii) a process of inputting (1_i)-th obfuscated data for training, among the (1_1)-st obfuscated data for training to the (1_m)-th obfuscated data for training, into a user learning network, to thereby allow the user learning network to apply a learning operation to the (1_i)-th obfuscated data for training and thus to generate first characteristic information for training, via at least one user task layer, to be used for performing a task of the user learning network, and at least one first user batch normalizing layer which adjusts a first average and a first variance of first outputs from the at least one user task layer, and (iii) a process of updating task parameters of the at least one user task layer and first batch parameters of the at least one first user batch normalizing layer that minimizes a first error to thereby train the user learning network, wherein the first error is calculated by referring to (1) the first characteristic information for training or a first task specific output for training created by using the first characteristic information for training and (2) a first ground truth of the (1_i)-th obfuscated data for training; and (b) the user learning device performing (i) a process of acquiring (2_1)-st original data for training to (2_n)-th original data for training from a user, wherein n is an integer equal to or greater than 1, (ii) a process of inputting (2_j)-th original data for training, among the (2_1)-st original data for training to the (2_n)-th original data for training, into the user learning network, to thereby allow the user learning network to apply the learning operation to the (2_j)-th original data for training and thus to generate second characteristic information for training, via the at least one user task layer and at least one second user batch normalizing layer which adjusts a second average and a second variance of second outputs from the at least one user task layer, and (iii) a process of updating the task parameters of the at least one user task layer and second batch parameters of the at least one second user batch normalizing layer that minimizes a second error to thereby train the user learning network, wherein the second error is calculated by referring to (1) the second characteristic information for training or a second task specific output for training created by using the second characteristic information for training and (2) a second ground truth of the (2_j)-th original data for training.

2. The method of claim 1, further comprising a step of:
(c) the user learning device performing (i) a process of acquiring (3_1)-st original data for training to (3_o)-th original data for training from the data provider, wherein o is an integer equal to or greater than 1 and equal to or less than m and wherein the (3_1)-st original data for training to the (3_o)-th original data for training are at least part of the (1_1)-st original data for training to the (1_m)-th original data for training, (ii) a process of inputting (3_k)-th original data for training, among the (3_1)-st original data for training to the (3_o)-th original data for training into the user learning network, to thereby allow the user learning network to apply the learning operation to the (3_k)-th original data for training and thus to generate third characteristic information for training, via the at least one user task layer and the at least one second user batch normalizing layer, and (iii) a process of updating the task parameters of the at least one user task layer and the second batch parameters of the at least one second user batch normalizing layer that minimizes a third error to thereby train the user learning network, wherein the third error is calculated by referring to (1) the third characteristic information for training or a third task specific output for training created by using the third characteristic information for training and (2) a third ground truth of the (3_k)-th original data for training.

3. The method of claim 1, further comprising a step of:
(d) the user learning device performing (i) a process of acquiring (4_1)-st original data for training to (4_p)-th original data for training from the user, wherein p is an integer equal to or greater than 1, (ii) a process of inputting (4_s)-th original data for training, among the (4_1)-st original data for training to the (4_p)-th original data for training, into the user learning network, to thereby allow the user learning network to apply the learning operation to the (4_s)-th original data for training and thus to generate fourth characteristic information for training, via the at least one user task layer and the at least one second user batch normalizing layer, (iii) a process of inputting the (4_s)-th original data for training into the obfuscation network, to thereby allow the obfuscation network to obfuscate the (4_s)-th original data for training and thus to generate (4_s)-th obfuscated data for training, (iv) a process of inputting the (4_s)-th obfuscated data for training into the trained provider learning network, to thereby allow the trained provider learning network to apply the learning operation to the (4_s)-th obfuscated data for training and thus to generate fifth characteristic information for training, and (v) a process of updating the task parameters of the at least one user task layer and the second batch parameters of the at least one second user batch normalizing layer that minimizes a fourth error to thereby train the user learning network, wherein the fourth error is calculated by referring to the (v-1) the fourth characteristic information for training and the fifth characteristic information for training or (v-2) (v-2-a) a fourth task specific output for training created by using the fourth characteristic information for training and (v-2-b) a fifth task specific output for training created by using the fifth characteristic information for training.

4. The method of claim 3, wherein the (4_1)-st original data for training to the (4_p)-th original data for training are unlabeled data whose ground truths are not labeled, and
wherein the user learning device uses the fifth characteristic information for training or the fifth task specific output for training as pseudo ground truths of the (4_s)-th original data for training which are at least part of the unlabeled data.

5. The method of claim 1, wherein a provider learning device has trained the obfuscation network by performing (i) a process of inputting sixth original data for training into the obfuscation network, to thereby allow the obfuscation network to obfuscate the sixth original data for training and thus to generate sixth obfuscated data for training, (ii) (ii-1) a process of inputting the sixth obfuscated data for training into the trained provider learning network, to thereby allow the trained provider learning network to apply the learning operation to the sixth obfuscated data for training and thus to generate sixth characteristic information for training and (ii-2) a process of inputting the sixth original data for training into the trained provider learning network, to thereby allow the trained provider learning network to apply the learning operation to the sixth original data for training and thus to generate seventh characteristic information for training, and (iii) a process of training the obfuscation network that minimizes a sixth error and maximizes a seventh error, wherein the sixth error is calculated by referring to the sixth characteristic information for training and the seventh characteristic information for training or by referring to a sixth task specific output for training created by using the sixth characteristic information for training, wherein the seventh error is calculated by referring to the sixth original data for training and the sixth obfuscated data for training.

6. The method of claim 5, wherein the trained provider learning network includes a first trained provider learning network to a u-th trained provider learning network performing respective provider tasks different from one another and wherein u is an integer equal to or greater than 1, and
wherein the provider learning device performs a process of training the obfuscation network by using an average error created by averaging provider network errors respectively corresponding to the first trained provider learning network to the u-th trained provider learning network or a process of training the obfuscation network by sequentially using the first trained provider learning network to the u-th trained provider learning network.

7. The method of claim 1, wherein a provider learning device has trained the obfuscation network by performing (i) a process of inputting eighth original data for training into the obfuscation network, to thereby allow the obfuscation network to obfuscate the eighth original data for training and thus to generate eighth obfuscated data for training, (ii) (ii-1) a process of inputting the eighth obfuscated data for training into the trained provider learning network, to thereby allow the trained provider learning network to apply the learning operation to the eighth obfuscated data for training and thus to generate eighth characteristic information for training, via at least one provider task layer and at least one third provider batch normalizing layer which adjusts a third average and a third variance of third outputs from the at least one provider task layer and (ii-2) a process of inputting the eighth original data for training into the trained provider learning network, to thereby allow the trained provider learning network to apply the learning operation to the eighth original data for training and thus to generate ninth characteristic information for training, via the at least one provider task layer and at least one fourth provider batch normalizing layer which adjusts a fourth average and a fourth variance of fourth outputs from the at least one provider task layer, (iii) a process of training the obfuscation network that minimizes at least one of (iii-1) an eighth error and (iii-2) a ninth error and maximizes a tenth error, wherein the eighth error is calculated by referring to the eighth characteristic information for training and the ninth characteristic information for training, wherein the ninth error is calculated by referring to an eighth task specific output for training created by using the eighth characteristic information for training, wherein the tenth error is calculated by referring to the eighth original data for training and the eighth obfuscated data for training.

8. The method of claim 1, wherein the user learning network includes a first user learning network to a t-th user learning network performing respective tasks different from one another and wherein t is an integer equal to or greater than 1, and
wherein the user learning device performs a process of training the first user learning network to the t-th user learning network that minimizes (i) user network errors respectively corresponding to the first user learning network to the t-th user learning network or (ii) an average error created by averaging the user network errors.

9. A method for testing a user learning network trained to recognize obfuscated data, created by obfuscating original data through an obfuscation network having been trained to obfuscate the original data, wherein a trained provider learning network recognizes the obfuscated data as same as the original data and, wherein the original data is indistinguishable from the obfuscated data, to protect personal information, comprising steps of:

(a) on condition that a user learning device has trained a user learning network by performing (i) a process of acquiring (1_1)-st obfuscated data for training to (1_m)-th obfuscated data for training from a data provider, wherein an obfuscation network generates the (1_1)-st obfuscated data for training to the (1_m)-th obfuscated data for training respectively by obfuscating (1_1)-st original data for training to (1_m)-th original data for training and wherein m is an integer equal to or greater than 1, (ii) a process of inputting (1_i)-th obfuscated data for training, among the (1_1)-st obfuscated data for training to the (1_m)-th obfuscated data for training, into the user learning network, to thereby allow the user learning network to apply a learning operation to the (1_i)-th obfuscated data for training and thus to generate first characteristic information for training, via at least one user task layer, to be used for performing tasks of the user learning network, and at least one first user batch normalizing layer which adjusts a first average and a first variance of first outputs from the at least one user task layer, (iii) a process of updating task parameters of the at least one user task layer and first batch parameters of the at least one first user batch normalizing layer that minimizes a first error, wherein the first error is calculated by referring to (1) the first characteristic information for training or a first task specific output for training created by using the first characteristic information for training and (2) a first ground truth of the (1_i)-th obfuscated data for training (iv) a process of acquiring (2_1)-st original data for training to (2_n)-th original data for training from a user, wherein n is an integer equal to or greater than 1, (v) a process of inputting (2_j)-th original data for training, among the (2_1)-st original data for training to the (2_n)-th original data for training, into the user learning network, to thereby allow the user learning network to apply the learning operation to the (2_j)-th original data for training and thus to generate second characteristic information for training, via the at least one user task layer and at least one second user batch normalizing layer which adjusts a second average and a second variance of second outputs from the at least one user task layer, and (vi) a process of updating the task parameters of the at least one user task layer and second batch parameters of the at least one second user batch normalizing layer that minimizes a second error to thereby train the user learning network, wherein the second error is calculated by referring to (1) the second characteristic information for training or a second task specific output for training created by using the second characteristic information for training and (2) a second ground truth of the (2_j)-th original data for training, a testing device performing a process of acquiring test data; and (b) the testing device performing (i) if the test data is determined as original data for testing, a process of inputting the test data into the user learning network, to thereby allow the user learning network to apply the learning operation to the test data and thus to generate first characteristic information for testing, via the at least one user task layer and the at least one second user batch normalizing layer and (ii) if the test data is determined as obfuscated data for testing, a process of inputting the test data into the user learning network, to thereby allow the user learning network to apply the learning operation to the test data and thus to generate second characteristic information for testing, via the at least one user task layer and the at least one first user batch normalizing layer.

10. A user learning device for training a user learning network to be used for recognizing obfuscated data, created by obfuscating original data through an obfuscation network having been trained to obfuscate the original data to generate the obfuscated data, wherein a trained provider learning network recognizes the obfuscated data as same as the original data and, wherein the original data is indistinguishable from the obfuscated data, to protect personal information, comprising:

at least one memory that stores instructions; and at least one processor configured to execute the instructions to perform: (I) (i) a process of acquiring $(1\_1)$-st obfuscated data for training to $(1\_m)$-th obfuscated data for training from a data provider, wherein an obfuscation network generates the $(1\_1)$-st obfuscated data for training to the $(1\_m)$-th obfuscated data for training respectively by obfuscating $(1\_1)$-st original data for training to $(1\_m)$-th original data for training and wherein m is an integer equal to or greater than 1, (ii) a process of inputting $(1\_i)$-th obfuscated data for training, among the $(1\_1)$-st obfuscated data for training to the $(1\_m)$-th obfuscated data for training, into a user learning network, to thereby allow the user learning network to apply a learning operation to the $(1\_i)$-th obfuscated data for training and thus to generate first characteristic information for training, via at least one user task layer, to be used for performing a task of the user learning network, and at least one first user batch normalizing layer which adjusts a first average and a first variance of first outputs from the at least one user task layer, and (iii) a process of updating task parameters of the at least one user task layer and first batch parameters of the at least one first user batch normalizing layer that minimizes a first error to thereby train the user learning network, wherein the first error is calculated by referring to (1) the first characteristic information for training or a first task specific output for training created by using the first characteristic information for training and (2) a first ground truth of the $(1\_i)$-th obfuscated data for training and (II) (i) a process of acquiring $(2\_1)$-st original data for training to $(2\_n)$-th original data for training from a user, wherein n is an integer equal to or greater than 1, (ii) a process of inputting $(2\_j)$-th original data for training, among the $(2\_1)$-st original data for training to the $(2\_n)$-th original data for training, into the user learning network, to thereby allow the user learning network to apply the learning operation to the $(2\_j)$-th original data for training and thus to generate second characteristic information for training, via the at least one user task layer and at least one second user batch normalizing layer which adjusts a second average and a second variance of second outputs from the at least one user task layer, and (iii) a process of updating the task parameters of the at least one user task layer and second batch parameters of the at least one second user batch normalizing layer that minimizes a second error to thereby train the user learning network, wherein the second error is calculated by referring to (1) the second characteristic information for training or a second task specific output for training created by using the second characteristic information for training and (2) a second ground truth of the $(2\_j)$-th original data for training.

11. The user learning device of claim 10, wherein the processor further performs:

(III) (i) a process of acquiring $(3\_1)$-st original data for training to $(3\_o)$-th original data for training from the data provider, wherein o is an integer equal to or greater than 1 and equal to or less than m and wherein the $(3\_1)$-st original data for training to the $(3\_o)$-th original data for training are at least part of the $(1\_1)$-st original data for training to the $(1\_m)$-th original data for training, (ii) a process of inputting $(3\_k)$-th original data for training, among the $(3\_1)$-st original data for training to the $(3\_o)$-th original data for training into the user learning network, to thereby allow the user learning network to apply the learning operation to the $(3\_k)$-th original data for training and thus to generate third characteristic information for training, via the at least one user task layer and the at least one second user batch normalizing layer, and (iii) a process of updating the task parameters of the at least one user task layer and the second batch parameters of the at least one second user batch normalizing layer that minimizes a third error to thereby train the user learning network, wherein the third error is calculated by referring to (1) the third characteristic information for training or a third task specific output for training created by using the third characteristic information for training and (2) a third ground truth of the $(3\_k)$-th original data for training.

12. The user learning device of claim 10, wherein the processor further performs:

(IV) (i) a process of acquiring $(4\_1)$-st original data for training to $(4\_p)$-th original data for training from the user, wherein p is an integer equal to or greater than 1, (ii) a process of inputting $(4\_s)$-th original data for training, among the $(4\_1)$-st original data for training to the $(4\_p)$-th original data for training, into the user learning network, to thereby allow the user learning network to apply the learning operation to the $(4\_s)$-th original data for training and thus to generate fourth characteristic information for training, via the at least one user task layer and the at least one second user batch normalizing layer, (iii) a process of inputting the $(4\_s)$-th original data for training into the obfuscation network, to thereby allow the obfuscation network to obfuscate the $(4\_s)$-th original data for training and thus to generate $(4\_s)$-th obfuscated data for training, (iv) a process of inputting the $(4\_s)$-th obfuscated data for training into the trained provider learning network, to thereby allow the trained provider learning network to apply the learning operation to the $(4\_s)$-th obfuscated data for training and thus to generate fifth characteristic information for training, and (v) a process of updating the task parameters of the at least one user task layer and the second batch parameters of the at least one second user batch normalizing layer that minimizes a fourth error to thereby train the user learning network, wherein the fourth error is calculated by referring to the (v-1) the fourth characteristic information for training and the fifth characteristic information for training or (v-2) (v-2-a) a fourth task specific output for training created by using the fourth characteristic information for training and (v-2-b) a fifth task specific output for training created by using the fifth characteristic information for training.

13. The user learning device of claim 12, wherein the (4_1)-st original data for training to the (4_p)-th original data for training are unlabeled data whose ground truths are not labeled, and
wherein the processor uses the fifth characteristic information for training or the fifth task specific output for training as pseudo ground truths of the (4_s)-th original data for training which are at least part of the unlabeled data.

14. The user learning device of claim 10, wherein a provider learning device has trained the obfuscation network by performing (i) a process of inputting sixth original data for training into the obfuscation network, to thereby allow the obfuscation network to obfuscate the sixth original data for training and thus to generate sixth obfuscated data for training, (ii) (ii-1) a process of inputting the sixth obfuscated data for training into the trained provider learning network, to thereby allow the trained provider learning network to apply the learning operation to the sixth obfuscated data for training and thus to generate sixth characteristic information for training and (ii-2) a process of inputting the sixth original data for training into the trained provider learning network, to thereby allow the trained provider learning network to apply the learning operation to the sixth original data for training and thus to generate seventh characteristic information for training, and (iii) a process of training the obfuscation network that minimizes a sixth error and maximizes a seventh error, wherein the sixth error is calculated by referring to the sixth characteristic information for training and the seventh characteristic information for training or by referring to a sixth task specific output for training created by using the sixth characteristic information for training, and wherein the seventh error is calculated by referring to the sixth original data for training and the sixth obfuscated data for training.

15. The user learning device of claim 14, wherein the trained provider learning network includes a first trained provider learning network to a u-th trained provider learning network performing respective provider tasks different from one another and wherein u is an integer equal to or greater than 1, and wherein the provider learning device performs a process of training the obfuscation network by using an average error created by averaging provider network errors respectively corresponding to the first trained provider learning network to the u-th trained provider learning network or a process of training the obfuscation network by sequentially using the first trained provider learning network to the u-th trained provider learning network.

16. The user learning device of claim 10, wherein a provider learning device has trained the obfuscation network by performing (i) a process of inputting eighth original data for training into the obfuscation network, to thereby allow the obfuscation network to obfuscate the eighth original data for training and thus to generate eighth obfuscated data for training, (ii) (ii-1) a process of inputting the eighth obfuscated data for training into the trained provider learning network, to thereby allow the trained provider learning network to apply the learning operation to the eighth obfuscated data for training and thus to generate eighth characteristic information for training, via at least one provider task layer and at least one third provider batch normalizing layer which adjusts a third average and a third variance of third outputs from the at least one provider task layer and (ii-2) a process of inputting the eighth original data for training into the trained provider learning network, to thereby allow the trained provider learning network to apply the learning operation to the eighth original data for training and thus to generate ninth characteristic information for training, via the at least one provider task layer and at least one fourth provider batch normalizing layer which adjusts a fourth average and a fourth variance of fourth outputs from the at least one provider task layer, (iii) a process of training the obfuscation network that minimizes at least one of (iii-1) an eighth error and a (iii-2) ninth error and maximizes a tenth error, wherein the eighth error is calculated by referring to the eighth characteristic information for training and the ninth characteristic information for training, wherein the ninth error is calculated by referring to an eighth task specific output for training created by using the eighth characteristic information for training, and wherein the tenth error is calculated by referring to the eighth original data for training and the eighth obfuscated data for training.

17. The user learning device of claim 10, wherein the user learning network includes a first user learning network to a t-th user learning network performing respective tasks different from one another and wherein t is an integer equal to or greater than 1, and
wherein the processor performs a process of training the first user learning network to the t-th user learning network that minimizes (i) user network errors respectively corresponding to the first user learning network to the t-th user learning network or (ii) an average error created by averaging the user network errors.

18. A testing device for testing a user learning network trained to recognize obfuscated data, created by obfuscating original data through an obfuscation network having been trained to obfuscate the original data, wherein a trained provider learning network recognizes the obfuscated data as same as the original data and, wherein the original data is indistinguishable from the obfuscated data, to protect personal information, comprising:
at least one memory that stores instructions; and
at least one processor configured to execute the instructions to perform: (I) on condition that a user learning device has trained a user learning network by performing (i) a process of acquiring (1_1)-st obfuscated data for training to (1_m)-th obfuscated data for training from a data provider, wherein an obfuscation network generates the (1_1)-st obfuscated data for training to the (1_m)-th obfuscated data for training respectively by obfuscating (1_1)-st original data for training to (1_m)-th original data for training and wherein m is an integer equal to or greater than 1, (ii) a process of inputting (1_i)-th obfuscated data for training, among the (1_1)-st obfuscated data for training to the (1_m)-th obfuscated data for training, into the user learning network, to thereby allow the user learning network to apply a learning operation to the (1_i)-th obfuscated data for training and thus to generate first characteristic information for training, via at least one user task layer, to be used for performing tasks of the user learning network, and at least one first user batch normalizing layer which adjusts a first average and a first variance of first outputs from the at least one user task layer, (iii) a process of updating task parameters of the at least one user task layer and first batch parameters of the at least one first user batch normalizing layer that minimizes a first error, wherein the first error is calculated by referring to (1) the first characteristic information for training or a first task specific output for training created by using the first characteristic information for training and (2) a first ground truth of the (1_i)-th obfuscated data for training, (iv) a process of acquiring (2_1)-st original data for training to (2_n)-th original data for training from a user, wherein n is an integer equal to or greater than 1, (v) a process of inputting (2_j)-th original data for training, among the (2_1)-st original data for training to the (2_n)-th original data for training, into the user learning network, to thereby allow the user learning network to apply the learning operation to the (2_j)-th original data for training and thus to generate second characteristic information for training, via the at least one user task layer and at least one second user batch normalizing layer which adjusts a second average and a second variance of second outputs from the at least one user task layer, and (vi) a process of updating the task parameters of the at least one user task layer and second batch parameters of the at least one second user batch normalizing layer that minimizes a second error to thereby train the user learning network, wherein the second error is calculated by referring to (1) the second characteristic information for training or a second task specific output for training created by using the second characteristic information for training and (2) a second ground truth of the (2_j)-th original data for training, a process of acquiring test data, and (II) (i) if the test data is determined as original data for testing, a process of inputting the test data into the user learning network, to thereby allow the user learning network to apply the learning operation to the test data and thus to generate first characteristic information for testing, via the at least one user task layer and the at least one second user batch normalizing layer and (ii) if the test data is determined as obfuscated data for testing, a process of inputting the test data into the user learning network, to thereby allow the user learning network to apply the learning operation to the test data and thus to generate second characteristic information for testing, via the at least one user task layer and the at least one first user batch normalizing layer.

\* \* \* \* \*